US007694311B2

(12) United States Patent
Amir et al.

(10) Patent No.: US 7,694,311 B2
(45) Date of Patent: Apr. 6, 2010

(54) GRAMMAR-BASED TASK ANALYSIS OF WEB LOGS

(75) Inventors: Arnon Amir, Saratoga, CA (US); Prasad Manikarao Deshpande, San Jose, CA (US); Savitha Srinivasan, San Jose, CA (US); Vladimir Zbarsky, Newark, CA (US)

(73) Assignee: International Business Machines Corporation, Armonk, NY (US)

( * ) Notice: Subject to any disclaimer, the term of this patent is extended or adjusted under 35 U.S.C. 154(b) by 1460 days.

(21) Appl. No.: 10/952,414

(22) Filed: Sep. 29, 2004

(65) Prior Publication Data

US 2006/0085788 A1    Apr. 20, 2006

(51) Int. Cl.
   G06F 3/00   (2006.01)
   G06F 9/44   (2006.01)
   G06F 9/46   (2006.01)
   G06F 13/00  (2006.01)

(52) U.S. Cl. .................. 719/320; 707/100; 709/200; 709/224

(58) Field of Classification Search ......... 719/310–313, 719/320; 714/33–47; 709/223–226, 200, 709/224; 707/1–10, 100, 101
   See application file for complete search history.

(56) References Cited

U.S. PATENT DOCUMENTS

| | | | |
|---|---|---|---|
| 5,874,572 A * | 2/1999 | Kim et al. .................. 540/460 |
| 5,966,705 A * | 10/1999 | Koneru et al. .................. 707/9 |
| 6,085,193 A * | 7/2000 | Malkin et al. .................. 707/10 |
| 6,151,601 A | 11/2000 | Papierniak et al. ............. 707/10 |
| 6,278,966 B1 | 8/2001 | Howard et al. .................. 703/23 |
| 6,338,066 B1 | 1/2002 | Martin et al. .................. 707/10 |
| 2002/0070953 A1 | 6/2002 | Barg et al. .................. 345/700 |
| 2002/0083067 A1 * | 6/2002 | Tamayo et al. .............. 707/100 |
| 2002/0156712 A1 | 10/2002 | Rambhia ...................... 705/36 |
| 2002/0198939 A1 * | 12/2002 | Lee et al. .................... 709/203 |
| 2003/0069877 A1 | 4/2003 | Grefenstette et al. ........... 707/2 |
| 2003/0126613 A1 | 7/2003 | McGuire .................... 725/109 |
| 2003/0163801 A1 | 8/2003 | Thames et al. .............. 717/123 |
| 2004/0019518 A1 | 1/2004 | Abraham et al. .............. 705/10 |
| 2004/0093412 A1 * | 5/2004 | Chen et al. .................. 709/224 |
| 2005/0071465 A1 * | 3/2005 | Zeng et al. .................. 709/224 |
| 2007/0011224 A1 * | 1/2007 | Mena ........................ 709/200 |

OTHER PUBLICATIONS

Romero et al, Discovering Prediction Rules in AHA! Course, Springer-Verlag Berlin Heidelberg, 2003, pp. 25-43.*

(Continued)

*Primary Examiner*—Diem K Cao
(74) *Attorney, Agent, or Firm*—IP Authority, LLC; Ramraj Soundararajan; Dan Johnson

(57) ABSTRACT

A method of detecting tasks performed by users wherein a single task is a sequence of web URLs invocation. Task patterns are detected in web logs to identify tasks performed by users and analyze task trends over time, across corporate divisions and geographies. A grammar-based framework is used to model and detect tasks from web log patterns. The framework has two components: a declarative unit—to generate a task grammar, and a processing unit—to detect tasks from access logs by generating a state machine for applying the task grammar to the tokens associated with the access records. By analyzing user tasks, rather than just URLs, useful business information can be extracted.

20 Claims, 11 Drawing Sheets

OTHER PUBLICATIONS

Mernik et al, Grammar-Based Systems: Definition and Examples, University of Maribor, Jan. 30, 2004, pp. 1-12.*

Ruiz et al, Development of a Relational Database Management System, JCS&T, vol. 3, No. 2, Oct. 2003, pp. 1-5.*

Dyreson, Using an Incomplete Data Cube as a Summary Data Sieve, IEEE, 1997, pp. 19-26.*

"Data Mining: An Overview from Database Perspective;" Chen et al.; *IEEE Transactions on Knowledge and Data Engineering*; 1997, pp. 1-40.

"Discovery of Interesting Usage Patterns from Web Data;" Cooley et al.; *WEBKDD*; 1999.

"Discovering Web Access Patterns and Trends by Applying OLAP and Data Mining Technology on Web Logs;" Zaïane et al.; *Advances in Digital Libraries*; 1998.

"Fast Algorithms for Mining Association Rules;" Agrawal et al.; *Proceedings of the 20th VLDB Conference*; 1994.

"From User Access Patterns to Dynamic Hypertext Linking;" Jacobsen et al.; *Fifth International World Wide Web Conference*; 1996; pp. 1-10.

"IBM SurfAid Analytics;" <http://surfaid.dfw.ibm.com/web/home/index.html>.

"Knowledge Discovery from Users Web-Page Navigation;" Shahabi et al.; *RIDE*; 1997.

"Link Prediction and Path Analysis Using Markov Chains;" Sarukkai, R.; *Proceedings of the 9th International World Wide Web Conference*; May 2000; pp. 1-15.

"The Link Prediction Problem for Social Networks;" Liben-Nowell et al.; *CIKM '03*; Nov. 2003; pp. 556-559.

"Mining Sequential Patterns;" Agrawal et al.; *11th International Conference on Data Engineering*; 1995.

"On Learning Video Browsing Behavior from User Interactions;" Westphal et al.; 2002.

"Smalltalk Tokenizer and Backus-Naur Form Parser;" *IBM Technical Disclosure Bulletin*; vol. 37, No. 12; Dec. 1994; pp. 313-316.

"SpeedTracer: A Web Usage Mining and Analysis Tool;" Wu et al.; *IBM System Journal: Internet Computing*; vol. 37, No. 1; 1998.

"Towards On-Line Analytical Mining in Large Databases;" Han, J.; *ACM Sigmod Record*; vol. 27, Issue 1; Mar. 1998; pp. 1-11.

"Web Usage Mining: Discovery and Applications of Usage Patterns from Web Data;" Srivastava et al.; *SIGKDD Explorations*; vol. 1, Issue 2; Jan. 2000; pp. 12-23.

"Web Usage Mining for Web Site Evaluation;" Spiliopoulou, M.; *Communications of the ACM*; vol. 43, No. 8; Aug. 2000; pp. 127-134.

"WUM: A Web Utilization Miner;" Spiliopoulou et al.; *Workshop on the Web and Data Bases*; 1998; pp. 1-7.

* cited by examiner

Figure 2

```
<Tasks> = <SearchTasks> | <BrowseTasks> | <ProfileTasks>.
<SearchTasks> = <SimpleContactLookup> | <SimpleSearchbyContactI> | <SimpleSearchbyExpertise> |
    <AdvancedSearchbyContact> | <AdvancedSearchbyExpertise>
<BrowseTasks> = <LearnAbtAPerson> | <BrowseReport2Chain>.
<ProfileTasks> = <UpdateProfileUsingForm> | <AddtoMyBluePages>.
<SearchTaskBeginners> = <A> | <T> | <U>.
<NonTaskBeginners> = <F> | <G> | <H> | <I> | <J> | <K> | <L> | <N> | <O> | <P> | <Q> | <R> | <S> | <V> | <X>.
<NonBrowseReport2Beginners> = <F> | <G> | <H> | <I> | <J> | <K> | <N> | <O> | <P> | <Q> | <R> | <S> | <V> | <X>.
<NonAddtoBluePagesBeginners> = <F> | <G> | <H> | <I> | <J> | <K> | <L> | <N> | <O> | <P> | <Q> | <R> | <S> | <X>.
<NonUpdateProfileUsingFormBeginners> = <F> | <G> | <H> | <I> | <J> | <K> | <L> | <O> | <P> | <Q> | <R> | <V> | <X>.
<BrowseProfile> = <G> | <H> | <I> | <J> | <K> | <L>.
<SimpleContactLookup> = <A>.
<SimpleSearchbyContact> = <A> <F>.
<SimpleSearchbyExpertise> = <A> <BrowseMultipleResults> <BrowseMultipleResults>+.
<AdvancedSearchbyContact> = <T> <NonTaskBeginners>?.
<AdvancedSearchbyExpertise> = <U> <NonTaskBeginners>?.
<LearnAbtAPerson> = <A> <F> <BrowseProfile>+
<BrowseMultipleResults> = <F> <BrowseProfile>?.
<BrowseReport2Chain> = <SearchTaskBeginners> <NonBrowseReport2Beginners>? <L> <NonTaskBeginners>?.
<UpdateProfileUsingForm> = <SearchTaskBeginners> <NonUpdateProfileUsingFormBeginners>? <M>
<NonUpdateProfileUsingFormBeginners>? <S> <NonTaskBeginners>?.
<AddtoMyBluePages> = <SearchTaskBeginners> <NonAddtoBluePagesBeginners>? <V> <SearchTaskBeginners>?.
<A> = "POST /pilot/bluepages/simpleSearch\.wss".
<F> = "GET /pilot/bluepages/searchByName\.wss\?\.\*task\=viewrecord".
<G> = "GET /pilot/bluepages/searchByName\.wss\?\.\*tab\=00_overview\.wss".
<H> = "GET /pilot/bluepages/searchByName\.wss\?\.\*tab\=00_job_contact_info\.wss".
<I> = "GET /pilot/bluepages/searchByName\.wss\?\.\*tab\=00_experience_skills\.wss".
<J> = "GET /pilot/bluepages/searchByName\.wss\?\.\*tab\=00_project_team\.wss".
<K> = "GET /pilot/bluepages/searchByName\.wss\?\.\*tab\=00_communities\.wss".
<L> = "GET /pilot/bluepages/OC_report_to_chain\.wss".
<M> = "POST /pilot/bluepages/editProfile\.wss".
<N> = "POST /pilot/bluepages/editJobContact\.wss".
<O> = "POST /pilot/bluepages/editExperience\.wss".
<P> = "POST /pilot/bluepages/editProject\.wss".
<Q> = "POST /pilot/bluepages/editPageCommunities\.wss".
<R> = "POST /pilot/bluepages/editPhoto\.wss".
<S> = "POST /pilot/bluepages/exitUpdate\.wss".
<T> = "POST /pilot/bluepages/advancedSearchCI\.wss".
<U> = "POST /pilot/bluepages/advancedSearchEP\.wss".
<V> = "\(POST \.\*addToMyBluePages\.wss\)\|\(GET \.\*\(?task\=addtomybluepages\)\)".
<X> = "POST /pilot/bluepages/gateway"
```

Figure 4

```
<START_SESSION>
[2004/14/26:12:47:59 -0500] "GET /pilot/bluepages/searchByName.wss?uid=050
[2004/14/26:12:48:48 -0500] "GET /pilot/bluepages/simpleSearch.wss?searchB
[2004/14/26:13:09:13 -0500] "GET /pilot/bluepages/simpleSearch.wss?searchB
[2004/14/26:13:16:15 -0500] "GET /pilot/bluepages/searchByName.wss?uid=082
[2004/14/26:13:16:21 -0500] "GET /pilot/bluepages/simpleSearch.wss?searchB
[2004/14/26:13:16:23 -0500] "GET /pilot/bluepages/searchByName.wss?uid=947
[2004/14/26:13:16:36 -0500] "GET /pilot/bluepages/searchByName.wss?uid=770
[2004/14/26:13:17:01 -0500] "GET /pilot/bluepages/searchByName.wss?uid=947
[2004/14/26:13:17:29 -0500] "GET /pilot/bluepages/searchByName.wss?uid=C-0
[2004/14/26:13:18:13 -0500] "GET /pilot/bluepages/searchByName.wss?uid=947
[2004/14/26:13:18:57 -0500] "GET /pilot/bluepages/searchByName.wss?uid=082
[2004/14/26:13:19:48 -0500] "GET /pilot/bluepages/searchByName.wss?uid=947
<END_SESSION>
<START_SESSION>
[2004/14/26:13:31:39 -0500] "GET /pilot/bluepages/simpleSearch.wss?searchB
[2004/14/26:13:31:57 -0500] "GET /pilot/bluepages/searchByName.wss?uid=070
[2004/14/26:13:33:14 -0500] "GET /pilot/bluepages/searchByName.wss?uid=082
[2004/14/26:13:33:34 -0500] "GET /pilot/bluepages/OC_report_to_chain.wss?r
[2004/14/26:13:34:09 -0500] "GET /pilot/bluepages/simpleSearch.wss?searchB
[2004/14/26:13:36:18 -0500] "GET /pilot/bluepages/searchByName.wss?uid=947
[2004/14/26:13:36:28 -0500] "GET /pilot/bluepages/searchByName.wss?uid=770
[2004/14/26:13:37:14 -0500] "GET /pilot/bluepages/searchByName.wss?uid=067
<END_SESSION>
<START_SESSION>
[2004/14/26:13:47:37 -0500] "GET /pilot/bluepages/searchByName.wss?uid=947
[2004/14/26:13:48:47 -0500] "GET /pilot/bluepages/simpleSearch.wss?searchB
[2004/14/26:13:48:56 -0500] "GET /pilot/bluepages/OC_report_to_chain.wss?r
[2004/14/26:13:51:16 -0500] "GET /pilot/bluepages/simpleSearch.wss?searchB
[2004/14/26:13:51:23 -0500] "GET /pilot/bluepages/searchByName.wss?uid=291
[2004/14/26:13:51:49 -0500] "GET /pilot/bluepages/simpleSearch.wss?searchB
[2004/14/26:13:59:03 -0500] "GET /pilot/bluepages/searchByName.wss?uid=291
<END_SESSION>
<START_SESSION>
[2004/14/26:16:10:28 -0500] "GET /pilot/bluepages/searchByName.wss?uid=986
[2004/14/26:16:10:45 -0500] "GET /pilot/bluepages/searchByName.wss?uid=140
[2004/14/26:16:11:08 -0500] "GET /pilot/bluepages/simpleSearch.wss?searchB
[2004/14/26:16:11:50 -0500] "GET /pilot/bluepages/searchByName.wss?uid=036
[2004/14/26:16:11:58 -0500] "GET /pilot/bluepages/simpleSearch.wss?searchB
[2004/14/26:16:12:07 -0500] "GET /pilot/bluepages/searchByName.wss?uid=775
[2004/14/26:16:12:34 -0500] "GET /pilot/bluepages/simpleSearch.wss?searchB
[2004/14/26:16:12:40 -0500] "GET /pilot/bluepages/searchByName.wss?uid=291
[2004/14/26:16:13:05 -0500] "GET /pilot/bluepages/searchByName.wss?uid=369
[2004/14/26:16:14:27 -0500] "GET /pilot/bluepages/searchByName.wss?uid=840
[2004/14/26:16:16:07 -0500] "GET /pilot/bluepages/searchByName.wss?uid=539
[2004/14/26:16:16:48 -0500] "GET /pilot/bluepages/searchByName.wss?uid=1A8
[2004/14/26:16:17:24 -0500] "GET /pilot/bluepages/searchByName.wss?uid=291
[2004/14/26:16:17:39 -0500] "GET /pilot/bluepages/searchByName.wss?uid=087
[2004/14/26:16:17:46 -0500] "GET /pilot/bluepages/searchByName.wss?uid=798
[2004/14/26:16:20:01 -0500] "GET /pilot/bluepages/searchByName.wss?uid=778
[2004/14/26:16:20:14 -0500] "GET /pilot/bluepages/searchByName.wss?uid=5A5
[2004/14/26:16:20:16 -0500] "GET /pilot/bluepages/searchByName.wss?uid=5A0
[2004/14/26:16:20:31 -0500] "GET /pilot/bluepages/searchByName.wss?uid=968
[2004/14/26:16:20:35 -0500] "GET /pilot/bluepages/searchByName.wss?uid=5A0
[2004/14/26:16:20:59 -0500] "GET /pilot/bluepages/searchByName.wss?uid=808
[2004/14/26:16:21:16 -0500] "GET /pilot/bluepages/searchByName.wss?uid=5A0
[2004/14/26:16:22:58 -0500] "GET /pilot/bluepages/searchByName.wss?uid=725
[2004/14/26:16:23:01 -0500] "GET /pilot/bluepages/searchByName.wss?uid=771
[2004/14/26:16:23:13 -0500] "GET /pilot/bluepages/searchByName.wss?uid=736
[2004/14/26:16:23:34 -0500] "GET /pilot/bluepages/simpleSearch.wss?searchB
[2004/14/26:16:24:06 -0500] "GET /pilot/bluepages/searchByName.wss?uid=082
[2004/14/26:16:24:07 -0500] "GET /pilot/bluepages/searchByName.wss?uid=067
[2004/14/26:16:24:11 -0500] "GET /pilot/bluepages/searchByName.wss?uid=947
[2004/14/26:16:25:05 -0500] "GET /pilot/bluepages/searchByName.wss?uid=736
[2004/14/26:16:35:18 -0500] "GET /pilot/bluepages/simpleSearch.wss?searchB
[2004/14/26:16:35:25 -0500] "GET /pilot/bluepages/simpleSearch.wss?searchB
[2004/14/26:16:35:35 -0500] "GET /pilot/bluepages/searchByName.wss?uid=233
<END_SESSION>
```

Figure 6

```
<START_SESSION>
A{2004/14/26:13:09:13 -0500}
F{2004/14/26:13:16:15 -0500}
A{2004/14/26:13:16:21 -0500}
F{2004/14/26:13:16:23 -0500}
F{2004/14/26:13:16:36 -0500}
F{2004/14/26:13:17:01 -0500}
F{2004/14/26:13:17:29 -0500}
H{2004/14/26:13:18:13 -0500}
H{2004/14/26:13:18:57 -0500}
F{2004/14/26:13:19:48 -0500}
<END_SESSION>
<START_SESSION>
A{2004/14/26:13:31:39 -0500}
F{2004/14/26:13:31:57 -0500}
F{2004/14/26:13:33:14 -0500}
L{2004/14/26:13:33:34 -0500}
A{2004/14/26:13:34:09 -0500}
F{2004/14/26:13:36:18 -0500}
F{2004/14/26:13:36:28 -0500}
F{2004/14/26:13:37:14 -0500}
<END_SESSION>
<START_SESSION>
F{2004/14/26:13:47:37 -0500}
A{2004/14/26:13:48:47 -0500}
L{2004/14/26:13:48:56 -0500}
A{2004/14/26:13:51:16 -0500}
F{2004/14/26:13:51:23 -0500}
A{2004/14/26:13:51:49 -0500}
H{2004/14/26:13:59:03 -0500}
<END_SESSION>
<START_SESSION>
F{2004/14/26:16:10:28 -0500}
F{2004/14/26:16:10:45 -0500}
A{2004/14/26:16:11:08 -0500}
F{2004/14/26:16:11:50 -0500}
A{2004/14/26:16:11:58 -0500}
F{2004/14/26:16:12:07 -0500}
A{2004/14/26:16:12:34 -0500}
F{2004/14/26:16:12:40 -0500}
F{2004/14/26:16:13:05 -0500}
F{2004/14/26:16:14:27 -0500}
F{2004/14/26:16:16:07 -0500}
F{2004/14/26:16:16:48 -0500}
F{2004/14/26:16:17:24 -0500}
F{2004/14/26:16:17:39 -0500}
F{2004/14/26:16:17:46 -0500}
F{2004/14/26:16:20:01 -0500}
F{2004/14/26:16:20:14 -0500}
F{2004/14/26:16:20:16 -0500}
F{2004/14/26:16:20:31 -0500}
F{2004/14/26:16:20:35 -0500}
F{2004/14/26:16:20:59 -0500}
F{2004/14/26:16:21:16 -0500}
F{2004/14/26:16:22:58 -0500}
F{2004/14/26:16:23:01 -0500}
F{2004/14/26:16:23:13 -0500}
A{2004/14/26:16:23:34 -0500}
F{2004/14/26:16:24:06 -0500}
F{2004/14/26:16:24:07 -0500}
F{2004/14/26:16:24:11 -0500}
I{2004/14/26:16:25:05 -0500}
A{2004/14/26:16:35:18 -0500}
A{2004/14/26:16:35:25 -0500}
F{2004/14/26:16:35:35 -0500}
<END_SESSION>
```

Figure 7

| Task | Daily Count | Total Time |
|------|-------------|------------|
| 1 | 5 | 000000:08:10 |
| 2 | 0 | 000000:00:00 |
| 3 | 7 | 000000:40:33 |
| 4 | 0 | 000000:00:00 |
| 5 | 0 | 000000:00:00 |
| 6 | 2 | 000000:02:04 |
| 7 | 0 | 000000:00:00 |
| 8 | 0 | 000000:00:00 |
| 9 | 0 | 000000:00:00 |
| 10 | 6 | 000000:00:00 |

Figure 8

| Task | Total Count | Total time [Sec] | Avg. time [Sec] |
|---|---|---|---|
| 1) | 36871 | - | - |
| 2) | 14180 | 405992 | 28.631 |
| 3) | 6457 | 700486 | 108.485 |
| 4) | 6620 | 1363887 | 206.025 |
| 5) | 2210 | 86918 | 39.329 |
| 6) | 3893 | 65512 | 16.828 |
| 7) | 1145 | 292712 | 255.644 |
| 8) | 1884 | 229909 | 122.032 |
| 9) | 1379 | 645834 | 468.335 |
| Total | 74639 | 3791250 | |

Figure 10

GRAMMAR-BASED TASK ANALYSIS OF WEB LOGS

BACKGROUND OF THE INVENTION

1. Field of Invention

The present invention relates generally to the field of web usage mining. More specifically, the present invention is related to analysis of access logs (e.g., web access logs) to provide insight into user behaviors.

2. Discussion of Prior Art

Enterprise-level Web analytics tools that transform Web log data into valuable e-business intelligence are becoming increasingly important since they provide a clear picture of the overall health and integrity of any e-business infrastructure. As a result, Web usage mining—the application of data mining techniques to discover usage patterns from Web log data—has been an active area of research and commercialization. By capturing, analyzing, storing, and reporting on web site usage, such tools provide essential metrics on visitor site interactions and the site's overall performance. This insight is often used to optimize the site for increased customer loyalty and e-business effectiveness. Usage characterization, Web site performance improvement, personalization, adaptive site modification, and market intelligence are some of the applications of Web usage mining as described in the articles entitled "Discovery of Interesting Usage Patterns from Web Data" and "Web Usage Mining: Discovery and Applications of Usage Patterns from Web Data," both by Cooley et al.

Identification of user interests, understanding user behavior, and tracking the popularity of pages are key ingredients to being successful in a competitive eCommerce marketplace. Web logs are studied and analyzed to indicate where a decrease in investment or possible change in web navigation should occur due to less visited Web or product pages. In commercial products, Web site effectiveness is frequently measured by correlating Web usage and traffic information with performance and availability metrics.

Path analysis is usually the basis of many Web analytics tools—its goal is to help understand a visitor's navigation of a web site. Path analysis can be simply defined as the list of pages that a visitor traverses in one visit. While this provides the exact, complete path for each visitor, it may not provide useful insights in terms of visitor behaviors. Therefore, various modifications of path analysis have been proposed such as a focused path analysis (limited list of pages, in order, that a visitor traverses in arriving at or departing from a particular page). Further enhancements include grouping site URLs and performing a path analysis on these groups rather than individual URLs. Ultimately, the path analysis serves to classify visits as "success" or "failure" against certain business objectives of making a sale and can be the basis of web site redesign. Another technique for getting insight into behavior is to look at the most popular behavior—i.e., tracking the frequency of each URL or group to understand flow.

Pattern discovery from Web logs draws upon methods and algorithms developed from several fields such as statistics, data mining, machine learning and pattern recognition as described in the articles entitled "Fast Algorithms for Mining Association Rules," by Agrawal et al.; "Mining Sequential Patterns," by Agrawal et al.; "From Data Mining to Knowledge Discovery: An Overview," by Fayyad et al.; "Data Mining: An Overview from Database Perspective," by Chen et al.; "From User Access Patterns to Dynamic Hypertext Linking," by Jacobsen et al.; and "Towards On-Line Analytical Mining in Large Databases," by Jiawei Han. Statistical techniques are the most common method to extract knowledge about visitors to a Web site. By analyzing the session file, one can perform different kinds of descriptive statistical analyses (frequency, mean, median, etc.) on variables such as age views, viewing time and length of a navigational path. Many Web traffic analysis tools produce a periodic report containing statistical information such as the most frequently accessed pages, average view time of a page or average length of a path through a site. Despite lacking in the depth of its analysis, this type of knowledge can be potentially useful for improving the system performance, enhancing the security of the system, facilitating the site modification task, and providing support for marketing decisions. Some examples of commercial products based on this type of analysis are Netperceptions®, Netzero®, Surfaid analytics, Truste: Building a Web you can believe in, and Webtrends® log analyzer.

Association rule generation can be used to relate pages that are most often referenced together in a single server session. Association rules refer to sets of pages that are accessed together with a support value exceeding some specified threshold. For example, association rule discovery using the a-priori algorithm described in the article entitled "Fast Algorithms for Mining Association Rules," by Agrawal et al., may reveal a correlation between users who visited a page containing electronic products to those who access a page about sporting equipment. However, with association rule discovery, the notion of a transaction for market-basket analysis does not take into consideration the order in which items are selected. The technique of sequential pattern discovery attempts to find inter-session patterns such that the presence of a set of items is followed by another item in a time-ordered set of sessions or episodes. By using this approach, Web marketers can predict future visit patterns which will be helpful in placing advertisements aimed at certain user groups.

Other types of temporal analysis that can be performed on sequential patterns include trend analysis, change point detection, or similarity analysis as described in the article entitled "Mining Sequential Patterns," by Agrawal et al. Dependency modeling is another useful pattern discovery task in Web Mining. The goal in dependency modeling is to develop a model capable of representing significant dependencies among the various variables in the Web domain. There are several probabilistic learning techniques that can be employed to model the browsing behavior of users. Such techniques include Hidden Markov Models and Bayesian Belief Networks as described in articles entitled "Link Prediction and Path Analysis Using Markov Chains," by R. R. Sarukkai, and "On Learning Video Browsing Behavior from User Interactions," by Westphal et al. The article entitled "The Link Prediction Problem for Social Networks," by Kleinberg et al., develops approaches to link prediction based on measures of the proximity of nodes in a network.

Projects described in articles entitled "Discovery of Interesting Usage Patterns from Web Data," by Cooley et al.; "Web Usage Mining for Web Site Evaluation," by Spiliopoulou, M.; "Speedtracer: A Web Usage Mining and Analysis Tool," by Wu et al.; "Discovering Web Access Patterns and Trends by Applying OLAP and Data Mining Technology on Web Logs," by Zaiane et al.; and "Knowledge Discovery from Users Web-Page Navigation," by Shahabi et al., have focused on Web Usage Mining in general, without specific focus of their Web mining techniques. The SpeedTracer project makes use of referrer and agent information in the preprocessing routines to identify users and server sessions in the absence of additional client side information. The Web Utilization Miner (WUM) system as described in the article entitled "WUM: A Web Utilization Miner," by Spiliopoulou et al., provides a robust mining language in order to specify characteristics of discovered frequent paths that are interesting to the analyst. In their approach, individual navigation paths, called trails, are combined into an aggregated tree structure.

A concept hierarchy, also known as taxonomy, generalizes concrete URLs into more abstract concepts. Concept hierarchies are also useful in data mining, especially for market-basket analysis as described in the article entitled "Data Mining Techniques for Marketing, Sales," by Berry et al. The analyst groups individual products into more general concepts, with the effect of also grouping purchases of the products together. Thus, associations that are too rare among individual products become apparent when the product groups are studied.

Sequence miners as described in the article entitled "Mining Sequential Patterns," by Agrawal et al., discover typical usage patterns by determining accesses to pages that occur frequently together in the same order. Only the designer of the site is aware of the larger tasks within which all detected patterns must be analyzed and evaluated. It would be much more efficient to automatically test the miner's results against the expectations of the designer. Therefore, enhancements need to be made in the field of miners so that more than just frequent sequences are found.

The patent to Howard et al. (U.S. Pat. No. 6,278,966 B1), assigned to International Business Machines Corporation, provides for a Method and System for Emulating Web Site Traffic to Identify Web Site Usage Patterns. It discusses a method for emulating behaviors of web site visitors for producing web site trend analysis data. Data mining association rules are applied to simulated traffic and used to identify usage patterns for users of a web site. Actions of users are tracked and reference distributions are developed that are compared to a site's usage distributions as obtained from actual visitors to the site. The reference distributions are used to implement statistical methods that measure relative information content.

The patent application publication to Tamayo et al. (2002/0083067 A1) provides for an Enterprise Web Mining System and Method. It discusses a method of enterprise web mining wherein a plurality of data mining models are generated using data that is collected from a plurality of data sources such as account or user based data, complementary external data, web server data and web transaction data. Predictions or recommendations are provided using the data mining models.

The patent to Papierniak et al. (U.S. Pat. No. 6,151,601), assigned to NCR Corporation, provides for a Computer Architecture and Method for Collecting, Analyzing and/or Transforming Internet and/or Electronic Commerce Data for Storage Into a Data Storage Area. It illustrates a method for effectively collecting, translating, refining, and analyzing Internet and/or electronic commerce data to provide useful marketing information. Web data is integrated with business data from a plurality of sources.

The patent to Martin et al. (U.S. Pat. No. 6,338,066 B1), assigned to International Business Machines Corporation, provides for a Surfaid Predictor: Web-Based System for Predicting Surfer Behavior. Web surfers behavior is predicted based on past surfer behavior. Multiple models of surfer behavior are generated by randomly selecting sample sessions from a web log.

The patent application publication to Lee et al. (2002/0198939 A1), assigned to International Business Machines Corporation, provides for a System and Method for Collecting and Analyzing Information about Content Requested in a Network (World Wide Web) Environment. A method for collecting, analyzing, aggregating and storing information about the content of one or more web pages served by a server on a network is discussed.

The patent application publication to McGuire (2003/0126613 A1) provides for a System and Method for Visualizing User Activity. It discusses a method for analyzing web server logs or other computer generated activity logs and converting the information contained in the logs, i.e., the log data into a visual, audio or audio/visual recreation of a user's accessing of a web site.

In contrast to Internet eCommerce sites that may optimize web site design to make a sale or obtain some personal information about a user, intranet Web applications have a different goal. Many corporate processes, such as procurement, human resources, travel reservations, and expense reimbursement, have a Web front that accesses, displays, and updates data on different backend servers. As an example, a global corporation such as IBM has over 1,000 Web applications supporting its business processes for its 300,000+ world-wide employees. The purpose of a web site, in this case, is to support a given process that needs to be performed in the most efficient manner. Free-form discovery of popular visitor paths is not necessarily insightful in evaluating the efficacy of such web sites. Instead, the web site is typically designed with a set of features to meet a set of requirements of the process it serves. Metrics that are relevant to evaluating such web sites are task-oriented—e.g., how effective was the site in getting the task accomplished, how long it takes to complete a specific task, what are the trends over time across different user populations in the corporation, etc.

One of the main problems with web logs analysis is that a single task performed by a user is composed of accessing multiple URLs. The same task may be performed in different ways, yet resulting with the same outcome. For example, upon accessing the website to buy a product, the product description page could be reached in a number of ways where the user could click to buy, which would lead to same final outcome, buying of the product. Thus, the sequence of URLs that the user accesses to buy the product is one task. Hence, it is beneficial to perform analysis of tasks rather than just sequences of URLs that the user accesses in a session. Thus, it is valuable to process a sequence of URLs and detect the semantics of the different tasks performed by the user.

The references and techniques described above provide for web log and user activity analysis. However, none of them discuss the ability to define patterns that represent entire tasks of interest using a formal grammar. Whatever the precise merits, features, and advantages of the above cited references, none of them achieves or fulfills the purposes of the present invention.

SUMMARY OF THE INVENTION

The present invention provides for a system for modeling and detecting tasks. The system has two components: a declarative unit, which generates a task grammar by relating the tasks with web access records, and a processing unit, which applies the task grammar to the tokens associated with the access records.

The present invention also provides for a method of detecting tasks by extracting access records from logs and applying a defined task grammar to tokenized access records in order to detect tasks.

The present invention also provides for a method of defining a task grammar by identifying access records and relating tasks with the access records.

The present invention also provides for computer program code-based products, implementing a method via software modules for detecting tasks wherein a task grammar is defined by relating tasks to access records and is applied to tokenized access records for detection.

Analyzing user tasks rather than just URLs provides a more robust analysis of user actions. The present invention's method provides a number of advantages. Some advantages are a deeper analysis of user actions using meaningful units of user interaction (i.e., tasks and business cost/value metrics); finer grained metrics on a per task basis rather than per URL; task associated with task attributes that may not be assigned to URLs; better measure of the effectiveness of the web site based on the time it takes to perform a task, task frequency, etc.; a grammar-based framework, flexible enough to define many different kinds of tasks in a relatively simple manner; and grammar-based task definition capturing an infinite number of possible different sequences which perform the same task in a very compact way.

The notion of tasks may be broadened to include not just web accesses but also database, application, or network access. Furthermore, a task may be built of sub-tasks. A sub-task may be a sequence of selections. A single task may be performed as part of one session or be carried over multiple sessions. A single task might be performed by one or more individuals, across multiple machines, and using a plurality of applications. A task may constitute multiple tasks in one session.

BRIEF DESCRIPTION OF THE DRAWINGS

FIG. 2 illustrates an expertise search result list in the example portal application used for the task analysis system, as per one embodiment of the present invention.

FIG. 4 illustrates a grammar definition for the BPP application, as per one embodiment of the present invention.

FIG. 6 illustrates an access log for one user divided into several sessions, as per one embodiment of the invention.

FIG. 7 illustrates the association of URLs with tokens, as per one embodiment of the invention.

FIG. 8 illustrates a summary of tasks detected by a finite state machine, as per one embodiment of the invention.

FIG. 10 illustrates a summary of total task counts and time taken for users over a period of time, as per one embodiment of the invention.

DESCRIPTION OF THE PREFERRED EMBODIMENTS

Figure 1:
FIG. 1 illustrates a personal page in the example portal application used for the task analysis system, as per one embodiment of the present invention.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention. The preferred embodiment is described in terms of a user accessing web-related access records (such as URLs) that are extracted from web logs. However, the invention can be applied to different kinds of accesses, access records and access logs. An access may be a sequence of button clicks or button selections on a user interface, an entry, an application access, a database access, or a network access. Also, access records may be any of (but not limited to) the following: URL entry, HTTP log entry, FTP log entry, RTSP log entry, network communication log entry, packets transfer log entry, keystroke log entry, database log entry, value entry into field in a user interface, mouse clicks log entry, user interface input log entry, application-specific log entry, server log entry.

The present invention provides a method for analyzing a stream of simple actions, such as accessing of URLs recorded on an Internet server by the user. The present invention provides a method to parse the sequence and detect and recognize different tasks being performed by a user. These tasks are useful for business analysis as compared to data generated by other tools for analyzing logs, such as page hits. Patterns are detected in web logs to identify tasks performed by users and analyze task trends over time, across corporate divisions and geographies. Even though tasks in the preferred embodiment relate to sequence of URLs accessed by the user, the notion of task can be applied to a transaction, a session, a job, an event, a project, a chore, an operation, or a form filling application (over multiple pages or steps). Hence, the type of task should not limit the scope of the present invention.

The process is better understood with the help of a portal application (BluePages Plus, or BPP) as shown in FIG. 1. However, it should be noted that the BPP is an example limited to web log access for a single portal application only. BluePages is an enhanced employee directory, coupled with a search engine on the Intranet. What differentiates BPP from the existing Blue Pages is the user's ability to create and easily modify a detailed profile listing of his/her technical skills, work experience, areas of expertise, teams, and assigned projects. Leveraging this multitude of information enables other employees to search for and locate an expert with desired knowledge and skills quickly and efficiently.

BPP first-time users start by filling out their profile, either manually via MyProfile tabs or by using a Flash™-based wizard. After that, a typical flow of a search process is as follows:

1. A user searches the directory using either "Simple" or "Advanced" search forms. The "Simple" search form accepts a single argument string, while the "Advanced" search forms allow setting different criteria in multiple fields. Users can also select between searching by contact information only or by the entire profile.

Figure 2:
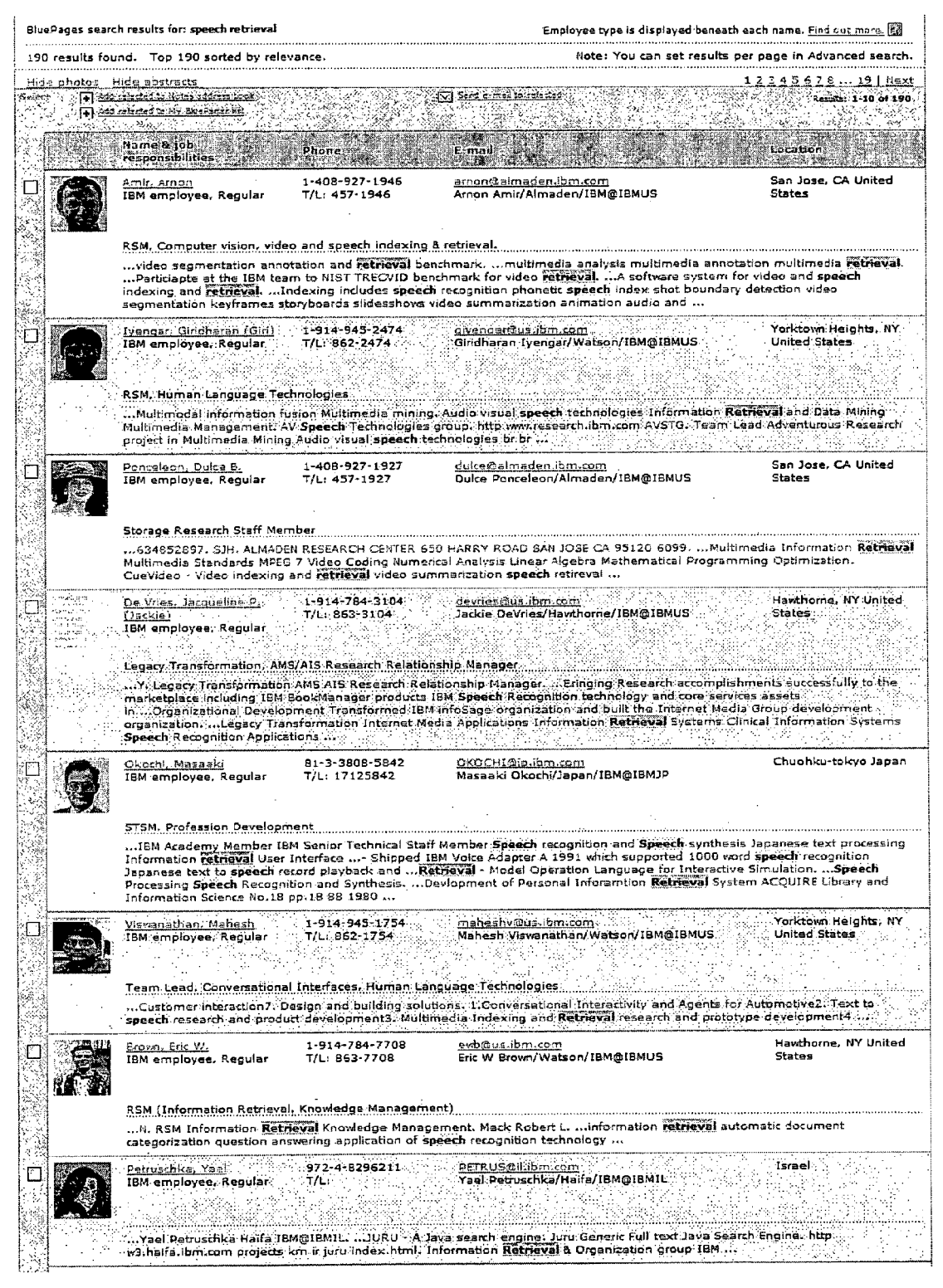

2. The user receives a page with search results as shown in FIG. 2, wherein the search results comprise basic contact information for each retrieved employee: name, phone, e-mail, location, and position.

3. To examine the results in detail, the user can open the detail description tabs for this person, as shown in FIG. 1. Six tabs are available (not shown in the figure): Jobs and Contact Info, Experience and Qualifications, Projects and Teams, Communities and Interests, Reporting Structure, and an Overview tab, summarizing information from other tabs. In case of a successful match, the user may add the person's record into his personal directory, denoted as My BlueP-ages.

The design goals of BPP include three main categories of functionalities: Search, Browse, and Profile. Based on these categories, nine tasks to be analyzed are defined.

1. Simple Contact lookup: A
   User performs a simple search by name and gets the required contact information (phone number or e-mail) in the results page.
2. Simple Contact Info Search: AF
   User performs a simple search by name, opens one result from the results page, and views the default brief description page for that person. This type of search is used by people searching for detailed contact information or more information about a person.
3. Learn about the person search: AF([G-L])+
   User performs a simple search by name, opens one result from the results page, and then opens at least one of six detailed description tabs (overview, job contact info, experience/skills, project/team, communities, and report-to info). This type of search is used when people want to learn more about the person.
4. Simple expertise search: A(F([G-L])*){2,}
   User performs a simple search by name, opens one result from the results page, possibly opens one or more detailed description tabs, and then returns to search results to examine more people. This kind of search is performed when searching for people fitting certain criteria, i.e., possessing certain skills or working on a particular team.
5. Advanced contact info search: T([^AMTU])*
   User performs an advanced search on contact info. This type of search is used when people want to search the directory by contact info using more complex and expressive query criteria.
6. Advanced expertise search: U([^AMTU])*
   User performs an advanced search on the entire profile. This type of search is used when people want to search the directory by all fields using more complex and expressive query criteria.
7. Browse the report-to chain: [ATU](([^AMTUL])*L([^AMTU])*)+
   User performs a simple search by name, opens one result, opens the report-to chain tab, clicks on someone in the report-to chain, and possibly continues exploring the organization structure further by clicking on the report-to chain tab of that person. This type of search pattern occurs when the searcher is studying the organizational chart via report-to chain.
8. Add to My BluePages: [ATU]([^ATUV])*V([^ATU])*
   User performs any search (simple or advanced, by contact info or by entire profile), resulting in at least one addition to My BluePages personal directory.
9. Edit and update the profile manually: ([ATU]([^ATUMS])*)? M([^AMTUS])*S([^AMTU])
   User possibly performs any search (simple/advanced by contact info/entire profile), then begins editing the profile using MyProfile detail tabs, and then submits the changes. This pattern represents a user successfully creating/updating his profile.

Figure 3:
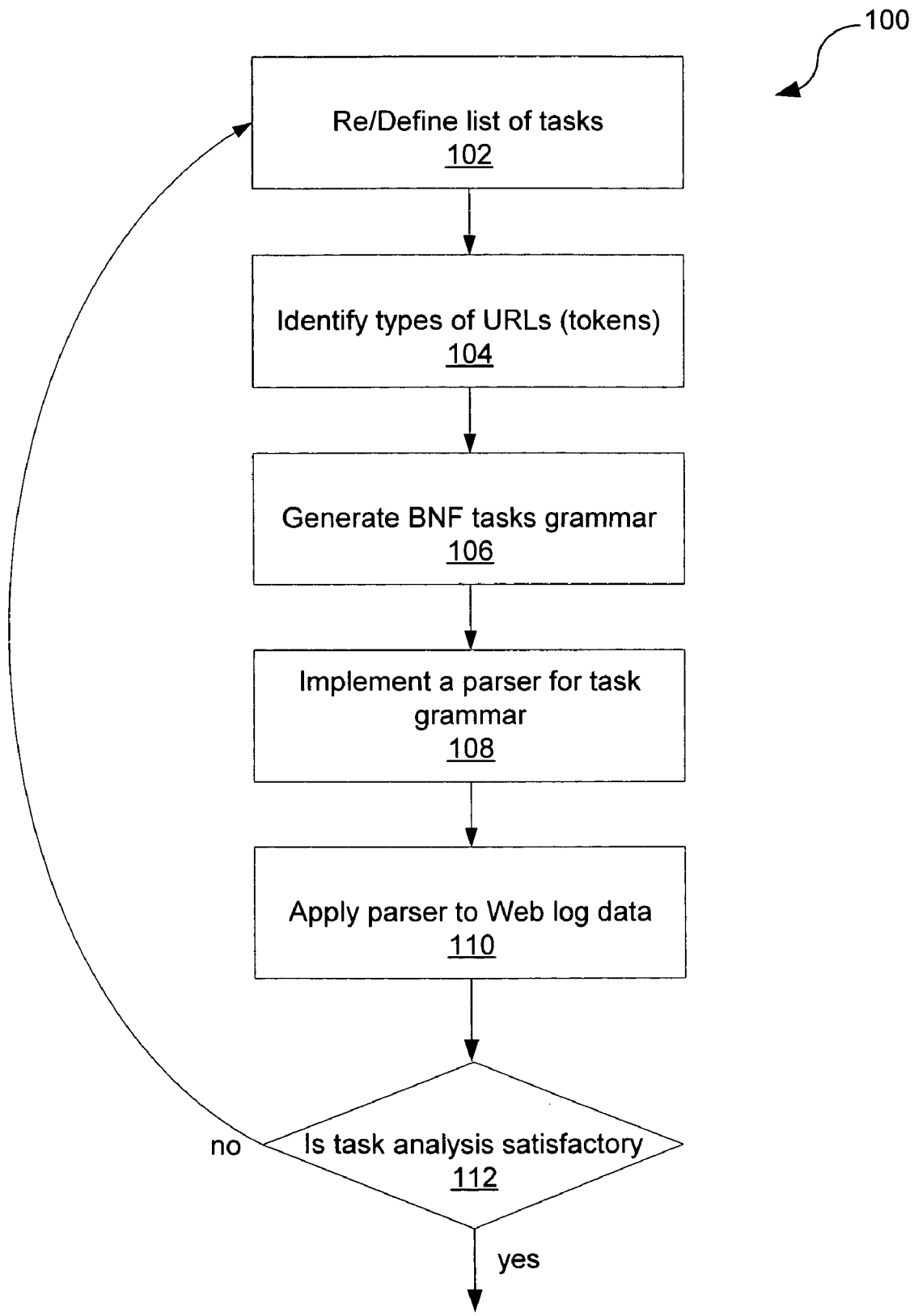
FIG. 3 illustrates a grammar based logarithmic framework, as per the one embodiment of the present invention.

These tasks are modeled in a grammar-based algorithmic framework as shown in FIG. 3. The framework has two components to it. The first component is a declarative unit wherein the Backus Naur form notation is used to represent the syntax of a regular grammar corresponding to web log patterns of interest. Second, a parser is generated and used to parse web logs against the grammar. By analyzing user tasks rather than just URLs, useful business information can be extracted. Processing of a token stream with the use of a text string tokenizer and a Backus-Naur Form syntax parser is described in the article entitled "SmallTalk Tokenizer and Backus-Naur Form Parser," by P. M. Gover.

FIG. 3 illustrates a flowchart of an exemplary embodiment of the present invention method 100. In step 102 one or more tasks to be analyzed are defined. These tasks arise from the web design, relevant forms, buttons, links, features/functions in system, or user studies to cover the three functionality categories. The tasks define logical and behavioral patterns. A task may be accomplished by going through a sequence of URLs. Types of URLs are identified and labeled by tokens in step 104. In one embodiment, tokens are alphabets of the tasks grammar. The URLs are labeled by alphabet letters, represented in this example by tokens A through X. Each valid URL within the web site is represented by an alphabet symbol. Any feasible sequence of alphabet symbols builds a word in the language (i.e., a task). Hence, the language defines all tasks that need to be detected. In step 106, a grammar is generated relating the tasks with tokens. The grammar may be constructed manually, automatically, or in various other ways. The grammar may be described in a very compact representation, such as Backus Naur form (BNF). The defined grammar can be used to detect and report any of (but not limited to) the following: unfinished tasks, broken tasks, unsuccessful tasks, failed tasks, paused tasks, stopped tasks, or cancelled tasks. FIG. 4 lists all the alphabets and the entire grammar for detecting nine different tasks of the BPP application (not strictly BNF).

It should be noted that a task may be built of one or more sub-tasks. For example, travel reservation task may include a "select destination" sub-task. The sub-task is a sequence of selections: first, selecting a country; then, a city; and then, a hotel or a street address. Hence, the grammar may also be defined in a hierarchical manner, detecting sub-tasks by one grammar and composing sub-tasks into tasks using another grammar (where sub-tasks would be associated with tokens, and sequences of those will be detected).

Referring back to FIG. 3, a parser is implemented for a grammar in step 108. In one embodiment, a state machine is used to implement the parser for a grammar. In another embodiment, the grammar is implemented as a regular expression search. In step 110, the parser receives a sequence of URLs and outputs the detected tasks and corresponding tokens.

In order to make sure that the grammar definition of tasks produces desired results, the grammar may be applied to experimental or sample log data and the grammar definition may be modified based on the analysis as shown in the optional step 112.

Figure 5:
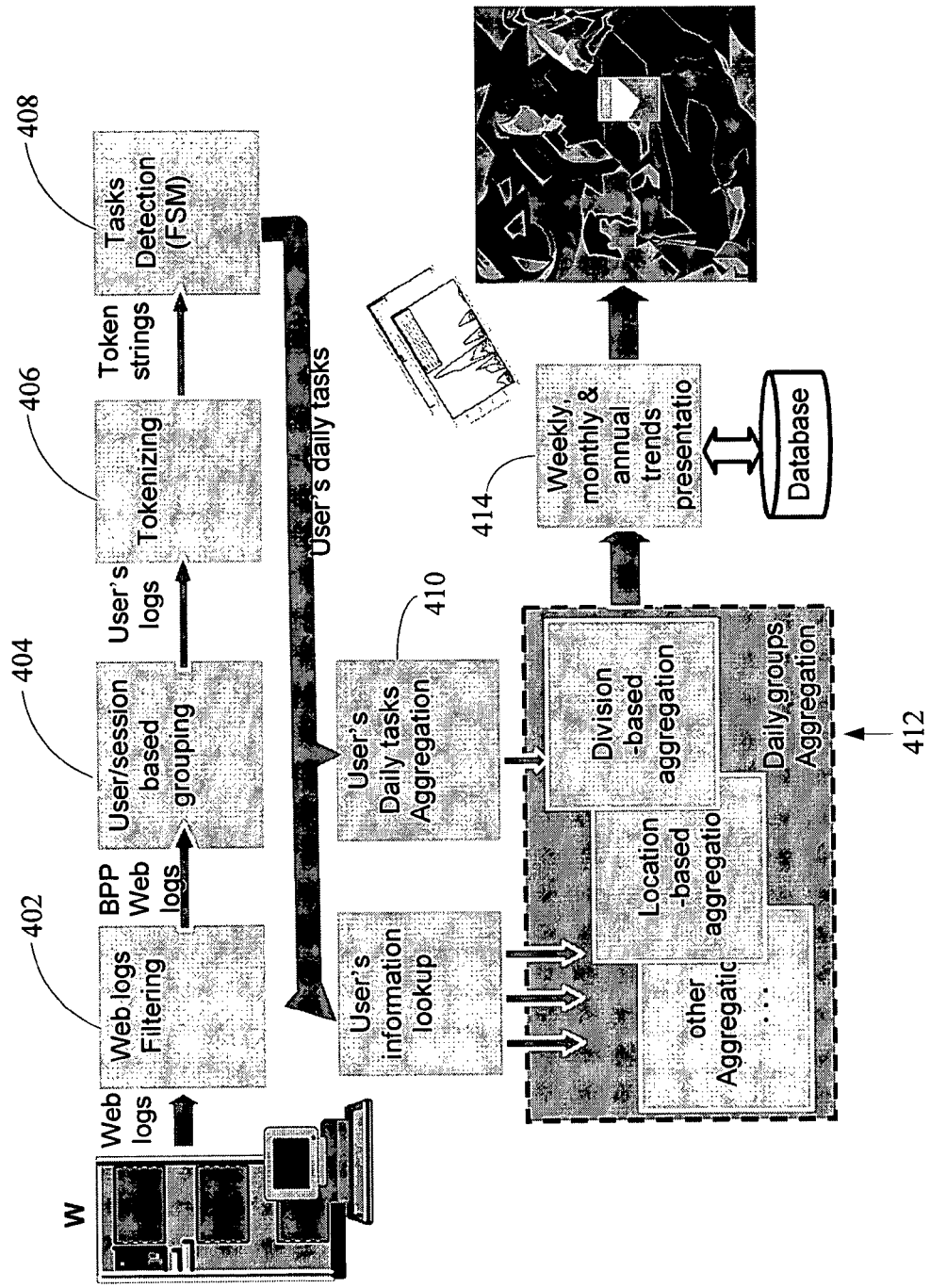
FIG. 5 illustrates a process for task detection and analysis in BPP, as per one embodiment of the present invention.

FIG. 5 describes the process for task detection and analysis in the BPP application. Web logs are received from internet server W and are filtered by element 402 to extract BPP web logs. In one preferred embodiment, Intranet web logs are tagged with user cookies corresponding to the pilot users of the BPP application. URLs are extracted from the web logs as components of the task patterns being detected. The URL logs are extracted, via element 404 into separate session files. For example, a session file can be all that the user accesses during 30 minutes of work. FIG. 6, shows an example of an access log for one user divided into multiple sessions. Each access is associated with a date and time, as well as user information not shown (all URLs are truncated). A single task may be performed as part of one session or may be carried over multiple sessions. Also, a task may incorporate the notion of a group wherein multiple tasks in one session are a single task. A task may be performed by accessing a plurality of logs or log files.

Referring back to FIG. 5, the session files-per-user are tokenized by element 406. FIG. 7 shows the tokens associated with the URLs of FIG. 6. Each URL is represented by one token according to its type. Information associated with the URL, such as time of access, may be carried together with the URL. These tokens are fed into element 408 which implements a finite state machine for parsing according to the task grammar.

A single task might be carried by one or more individuals, over several sessions, machines, and different applications. One such example is the purchasing of an item. This task involves a person placing an order, a manager approving the order, a purchasing department transferring the order to a supplier, shipping, receiving, accounting, and so on. Hence the logs of several different applications may need to be parsed together in order to detect this task and find, for example, how long it took to complete.

After tasks are detected using the grammar, task analysis may follow. The time taken to perform a task is computed using the timestamps in the URL logs. Pauses in the work may be detected by the duration between consecutive URLs or by other means in the application. A daily user log is created for each user who performs at least one task that day. Each logged record contains the daily task count and the total time for any of the tasks the user performed. A single 30 minute user's session may contain multiple tasks of different types. The grammar-based analyzer parses the sequence, segments the stream of URLs into tasks, and assigns the corresponding time duration to each task.

Referring back to FIG. 5, the detected tasks may be logged in a database, a file, an archive, a report, or a remote server. Daily tasks performed by a single user are aggregated in element 410. FIG. 8 shows one example for a summary table of tasks detected by the finite state machine after daily aggregation. The first column lists the task number, the second column is the number of times the task was performed by the user during a day, and the last column is the total amount of time the user spent on performing a particular task for the given number of time. For example, Task 1 was performed 5 times in a total of 8 minutes and 10 seconds. Task 10 was performed 6 times, however it is involved with only a single URL access and is therefore associated with zero total time. Tasks are aggregated across a user population based on user attributes such as division and country in element 412. Weekly, monthly, and annual trends are plotted in element 414, based on the aggregated data. By logging only population-based information rather than user-specific information, user's privacy can be reserved.

Figure 9:
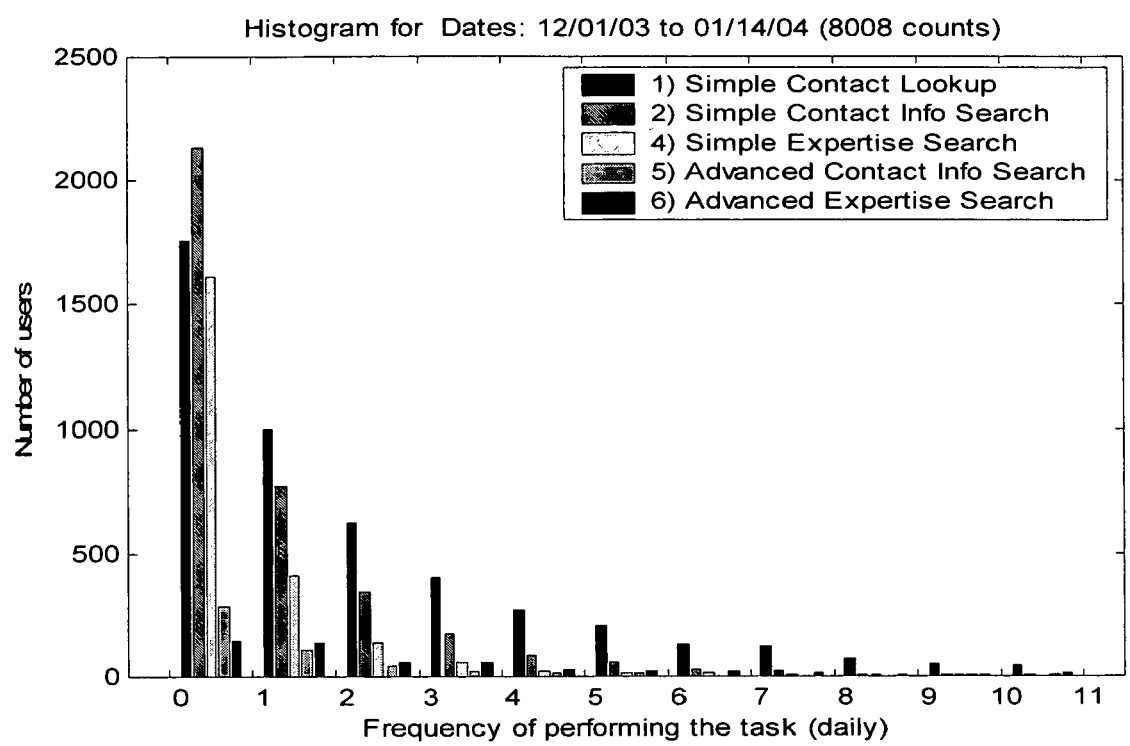
FIG. 9 illustrates a histogram for search tasks, as per one embodiment of the invention.

Applying the task detection and analysis process to daily logs over a period can provide valuable insights into the usage pattern for different users. Distribution of tasks daily frequency is studied to determine the most frequent tasks. The daily frequency is the number of times the task is performed by a single user in a single day. FIG. 9 plots the distribution of the daily frequency against the number of user-days performing the task at that daily frequency. The height of a column represents the total number of user-days these users performed the task at that daily frequency. This gives an insight into the relative daily frequency of different tasks. For example, there is an interesting trend among the daily frequencies of the Simple Contact Info Search task and Simple Contact Lookup task—two alternative simple ways to find the contact information of a person. The number of users performing Simple Contact Info Search drops more rapidly compared to those performing Simple Contact Lookup. This shows that users who use search more frequently prefer the faster Simple Contact Lookup over the Simple Contact Info Search. Such graphs allow fine-tuning the task's Web page to increase efficiency of fast tasks and decrease usage of more time consuming alternative tasks.

FIG. 10 summarizes the tasks and time taken for the tasks across a period of time. Note that Task 1 misses the time information since it involves accessing a single URL.

Figure 11:
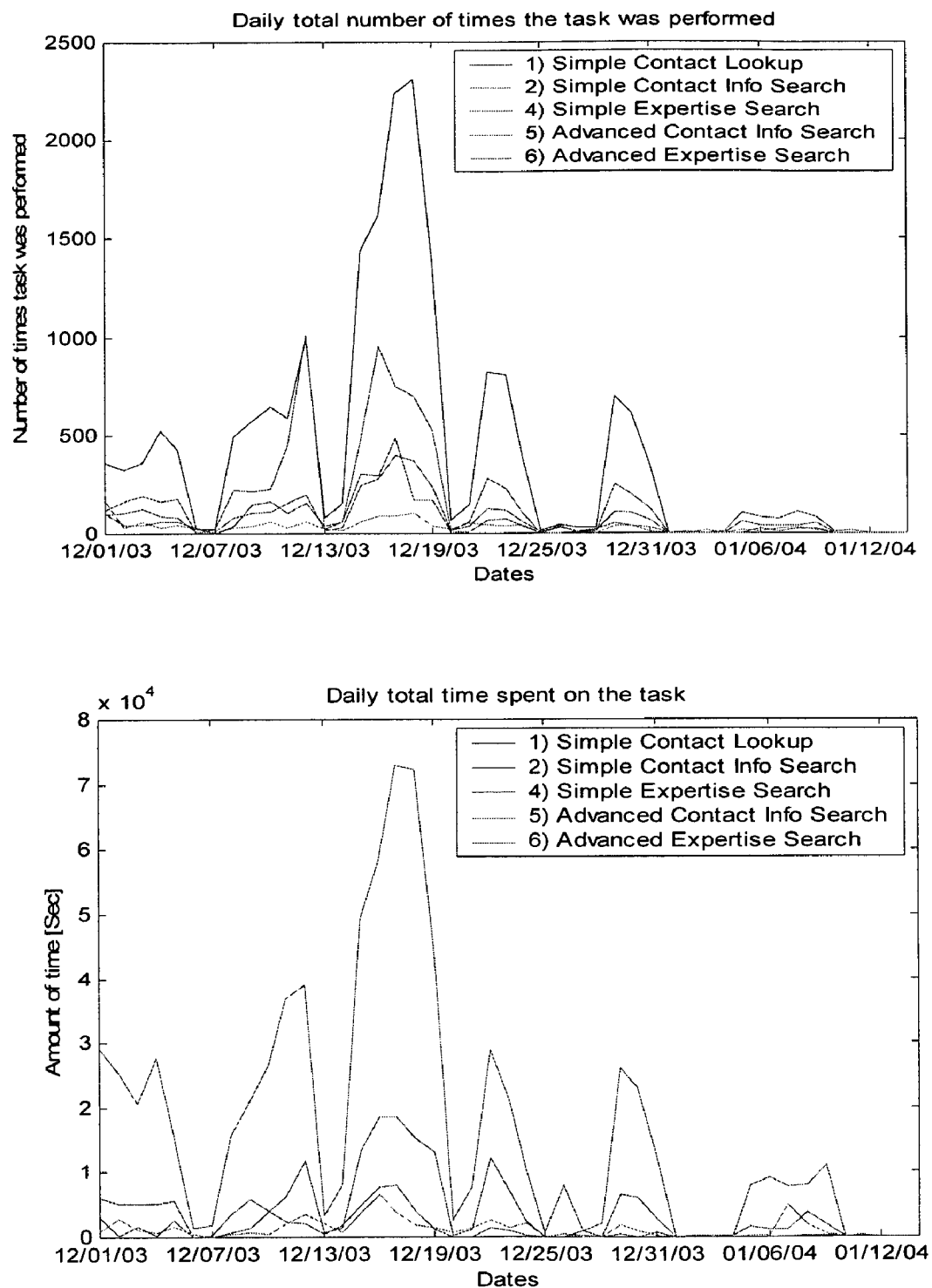
FIG. 11 illustrates daily total tasks performed and the time they consumed, as per one embodiment of the invention.

FIG. 11 shows daily trends for tracking task activity along time. While time and task counts are associated, the trends might be different. For example, the counts for Simple Expertise Search are low, but the times are high. This shows that time spent per Simple Expertise Search is quite high. It takes a long time for users to find people with a particular expertise since they have to browse their profiles and figure out if it is the appropriate person they are seeking. Similarly the time per task for the advanced searches is high. Long term trends may also provide other information.

When tasks are detected, they may not only be related with attributes that are already associated with the URL, such as time as discussed above, but also with other attributes that are associated with the user, such as work location, profession, department, job role; with attributes that are associated with the task itself, such as query for expertise search in BPP. The task may be associated with entities such as user's computer, user's account, or the application. Such user-related information is retrieved from a user's database. Information in access records, such as name of a book that was ordered in a session, destination of flight that was reserved in a database, or purchasing price or vendor in a transaction, may also be associated with a task and may be used to classify tasks. This is where such cross-entity information may be analyzed together to find desired information. This information requires such a task analysis to be able to link together pieces of information of such different entities. Also, in case of other types of accesses, such as network access, IP addresses, number of transferred packets, or bit rate may be used as attributes. Similarly, an access to a database may have record numbers and any changes made to them as attributes.

Additionally, the present invention provides for an article of manufacture comprising computer readable program code contained within implementing one or more modules to perform grammar-based task analysis of web logs. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code-based products are software modules for receiving an access log; extracting access records from said access log into session files per user; labeling each said access record with a token; and applying a task grammar to said tokens to detect tasks, wherein said task grammar is defined by defining at least one task to be analyzed, identifying at least one type of access record, and relating said task with said access record.

CONCLUSION

A system and method has been shown in the above embodiments for the effective implementation of grammar-based task analysis of web logs. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by the type of grammar used, type of task, type of access, type of access log attributes, implementation of a grammar, a portal application, software/program, computing environment, or specific computing hardware.

The above enhancements are implemented in various computing environments. For example, the present invention may be implemented on a conventional IBM PC or equivalent, multi-nodal system (e.g., LAN), or networking system (e.g., Internet, WWW, wireless web). All programming and data related thereto are stored in computer memory, static or dynamic, and may be retrieved by the user in any of: conventional computer storage, display (i.e., CRT), and/or hardcopy (i.e., printed) formats. The programming of the present invention may be implemented by one of skill in the art of software and web-related programming.

The invention claimed is:

1. An article of manufacture having computer readable storage medium comprising computer readable program code executable by a computer to implement a method of detecting tasks, said medium comprising:
   computer readable program code labeling each URL in a set of URLs with a token;
   computer readable program code defining a task grammar based on identifying a plurality of tasks, each task based on a feasible sequence of tokens representing a sequence of URLs accessed to accomplish that task;
   computer readable program code receiving a web access log;
   computer readable program code extracting and tokenizing a sequence of accessed URLs from said web access log, said sequence of URLs part of said set of URLs for which said task grammar is defined;
   computer readable program code applying said task grammar to said tokenized sequence of accessed URLs; and
   computer readable program code, based on said applying said task grammar, identifying and reporting one or more tasks, each identified task comprising at least one of the following: a task that comprises one or more sub-tasks, a task that is carried over several sessions, a partial task in one session, and a group of tasks in one session.

2. The article of manufacture of claim 1, wherein said grammar is compact and is described in Backus Naur form (BNF).

3. The article of manufacture of claim 1, wherein each task comprises at least one of the following: a transaction, a session, a job, an event, a project, a chore, an operation and a form filling application.

4. The article of manufacture of claim 1, wherein said task grammar is defined in a hierarchical manner to detect said sub-tasks.

5. The article of manufacture of claim 1, wherein each task is performed by at least one of the following: one or more users, a plurality of machines, a plurality of applications, and accessing a plurality of logs or log files.

6. The article of manufacture of claim 1, wherein each task is associated with at least one attribute associated with at least one of the following entities: user, user's computer, user's account, subject matter of the task, and application.

7. The article of manufacture of claim 6, wherein information associated with a user is retrieved from a database.

8. The article of manufacture of claim 6, wherein each task is analyzed based on at least one of the following said attributes: demography, location, department, job, and title.

9. The article of manufacture of claim 6, wherein each task is analyzed based on at least one of the following said attributes: demography, location, department, job, and title.

10. The article of manufacture of claim 1, wherein time recorded in said web access log is used to compute time taken to complete each task.

11. An article of manufacture having computer readable storage medium comprising computer readable program code executable by a computer to implement a method of detecting tasks, said medium comprising:
    computer readable program code labeling each URL in a set of URLs with a token;
    computer readable program code defining a task grammar based on identifying a plurality of tasks, each task based on a feasible sequence of tokens representing a sequence of URLs accessed to accomplish that task;
    computer readable program code receiving a web access log;
    computer readable program code extracting and tokenizing a sequence of accessed URLs from said web access log, said sequence of URLs part of said set of URLs for which said task grammar is defined;
    computer readable program code applying said task grammar to said tokenized sequence of accessed URLs; and
    computer readable program code, based on said applying said task grammar, detecting and reporting any of, or a combination of, the following: unfinished task, broken tasks, unsuccessful task, failed tasks, paused tasks, stopped tasks, or canceled tasks.

12. The article of manufacture of claim 11, wherein said grammar is compact and is described in Backus Naur form (BNF).

13. The article of manufacture of claim 11, wherein each task comprises at least one of the following: a transaction, a session, a job, an event, a project, a chore, an operation and a form filling application.

14. The article of manufacture of claim 11, wherein said task grammar is defined in a hierarchical manner to detect one or more sub-tasks.

15. The article of manufacture of claim 11, wherein each task is performed by at least one of the following: one or more users, a plurality of machines, a plurality of applications, and accessing a plurality of logs or log files.

16. The article of manufacture of claim 11, wherein each task is associated with at least one attribute associated with at least one of the following entities: user, user's computer, user's account, subject matter of the task, and application.

17. The article of manufacture of claim 16, wherein information associated with a user is retrieved from a database.

18. The article of manufacture of claim 16, wherein each task is analyzed based on at least one of the following said attributes: demography, location, department, job, and title.

19. The article of manufacture of claim 16, wherein each task is analyzed based on at least one of the following said attributes: demography, location, department, job, and title.

20. The article of manufacture of claim 11, wherein time recorded in said web access log is used to compute time taken to complete each task.

\* \* \* \* \*